F. J. CHRISTMAN.
CLAMP.
APPLICATION FILED FEB. 11, 1909.
937,766.
Patented Oct. 26, 1909.
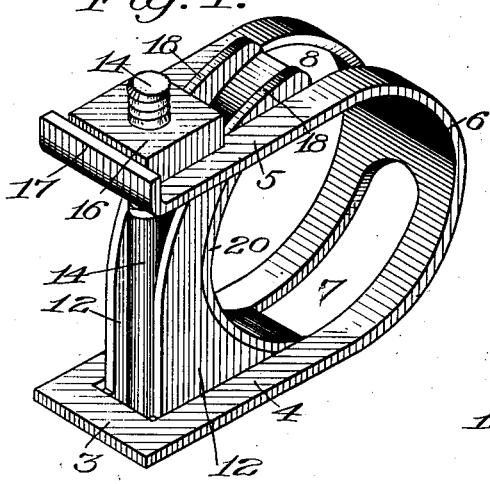
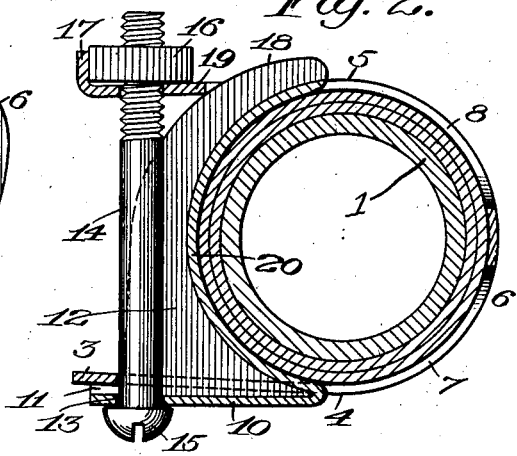
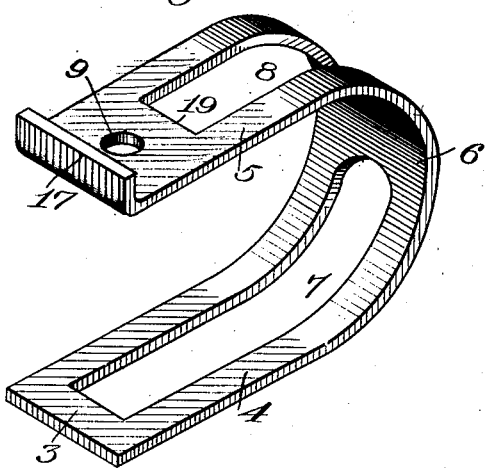
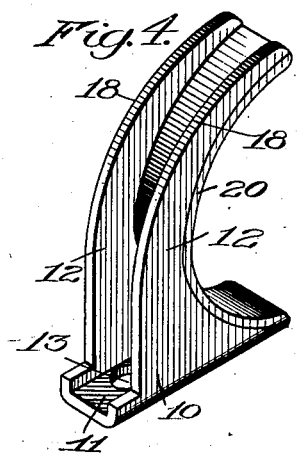
Witnesses
Nelson Copp
Russell B. Griffiths
Inventor
Frank J. Christman
By Chester Rich
his Attorney

UNITED STATES PATENT OFFICE.

FRANK J. CHRISTMAN, OF SYRACUSE, NEW YORK.

CLAMP.

937,766.

Specification of Letters Patent.

Patented Oct. 26, 1909.

Application filed February 11, 1909. Serial No. 477,421.

*To all whom it may concern:*

Be it known that I, FRANK J. CHRISTMAN, of Syracuse, in the county of Onondaga and State of New York, have invented certain new and useful Improvements in Clamps; and I do hereby declare the following to be a full, clear, and exact description of the same, reference being had to the accompanying drawings, forming a part of this specification, and to the reference-numerals marked thereon.

My present invention relates generally to clamping devices and it has for its object to provide an article of this character in the nature of a draw ring which will be suitable for use in joining hose pipes to couplings and in analogous ways.

A further object of my invention is to produce a simple, easily assembled structure and, further, one of great efficiency in cases (as in that of the hose connection) where it is desirable that the clamping pressure be applied from practically all directions about a cylindrical or polyhedral body.

To these and other ends the invention consists in certain improvements and combinations of parts all as will be hereinafter more fully described, the novel features being pointed out in the claims at the end of the specification.

In the drawings: Figure 1 is a perspective view of a clamp constructed in accordance with and illustrating one embodiment of my invention; Fig. 2 is a central section thereof;
Fig. 3 is a detail perspective view of the yoke or supporting member; and Fig. 4 is a similar view of what I term the guard member.

I have illustrated my invention in the present instance as embodying a device particularly adapted for clamping hose pipes about members arranged within them as such an application makes clear its several characteristic advantages, but it will be understood that I conceive a broader field of usefulness, other applications of clamps of this type being well known.

Referring more particularly to the drawings, and first to Fig. 2 thereof, 1 may be considered to represent a relatively stiff splicing sleeve or coupling piece about which the hose pipe 2 is to be clamped. I provide a supporting member in the present form of a yoke 3 having oppositely arranged side walls 4 and 5 formed by the respective arms of the yoke and an intermediate connecting wall 6 formed by the loop or closed end of the yoke, the said walls being arranged about the hose pipe to contact it upon practically three sides, as shown. The material of the yoke is flexible and preferably resilient or elastic, such as spring metal rendering the arms or walls 4 and 5 movable relatively toward and from each other and the latter are provided with alined elongated openings 7 and 8, one of them also having an aperture 9 therein.

Were the structure so far described relied upon for the entire clamping action by drawing the opposed walls 4 and 5 together by any suitable means, there would be a portion of the circumference of the pipe at the open side of the yoke of an extent varying between a quarter and perhaps a third of its extent upon which there would be no pressure applied. I therefore, by the present invention, provide a guard member which spans this open side of the yoke opposite the loop or connecting wall and contacts the hose pipe or other object up to the points where the pressure of the yoke becomes effective and I prefer to so mount this member as to cause it to automatically move toward and against the object simultaneously with the tightening movement of the yoke. The said guard is illustrated in detail in Fig. 4 and is in the present instance constructed of reasonably stiff sheet material comprising in the present instance a body portion 10 of a shape permitting it to be arranged within the opening 7 of one of the yoke arms and having an extension 11 thereon to form a rocking bearing on the outer side of said arm. Bent at right angles from the body portion 10 are a pair of wings 12 preferably arranged in parallelism in the general plane of the yoke and with one pair of their edges turned toward the object to be clamped which wings span the yoke in a transverse direction, their opposite ends being preferably passed through the opening 8 in the opposite wall or arm 5. The body portion 10 of the guard is also provided with an aperture 13 corresponding with the aperture 9 in the yoke arm 5 and through these two apertures is passed, in the present instance, a bolt 14 having a head 15 and a nut 16 threaded thereon at opposite ends to bear upon the outer sides of the arm 5 and the guard, respectively, as a means for drawing the arms of the yoke together and tightening it about the hose pipe, the resiliency of the material of the yoke operating to spread the arms as the bolt is loosened. A locking shoulder 17 is preferably provided on one arm adjacent the nut 16 so that the adjustment may be effected by a mere rotation of the bolt from the opposite end.

The devices employed for moving the guard member toward the object or toward the closed end of the yoke as the arms of the latter are drawn together embody in the present instance a cam mechanism, one element of which is arranged on the guard while the other is carried with one of the arms. In the present embodiment I provide the cam surface by curving the outer edges of the wings 12 of the guard, as at 18, and so proportioning the parts that this cam will ride against an abutment formed by a wall 19 of the opening 8 in the arm 5. As the arms are drawn together through the medium of the bolt 14, it will be seen from an inspection of Fig. 2 that the cam mechanism, just described, will force the guard inwardly in approximately a proper ratio to the corresponding contracting movement of the movable portions of the yoke, the said guard rocking upon a fulcrum formed by the projection 11. The hose pipe, or other object, is thus compressed simultaneously from all sides and, in the case of the hose pipe, any wrinkling or gathering of its flexible material at the mouth or open side of the yoke, due to the compression of other portions by the latter, is obviated and the escape of the water or other contents of the pipe at this point prevented.

It will be noted that while the projection 11 on the guard is at one side of the bolt or operating means, the effective pressure of the latter is close enough thereto to prevent the inadvertent engagement of the said projection from the arm during the rocking movement, in view of the fact that the guard is in engagement with the abutment 19 at its other end, which abutment is upon the opposite side of the bolt. Similarly when the bolt is loosened, the resiliency of the yoke arms maintains the contents and a degree of pressure at the headed bolt ends so that the guard and the cam surface thereon do not leave the abutment 19, but travel outwardly in engagement therewith restoring the full capacity of the clamp for another application in the event that the object being clamped is threaded through the loop of the yoke without removing the guard. In its application to a hose, however, or in analogous uses it may be convenient to insert the object or to apply the yoke to the object transversely between the open arms of the yoke, in which case it will be apparent that the device can be disassembled by removing the bolt and withdrawing the guard through the opening 7.

In some cases it might be desirable to leave the inner edges of the wings 12 of the guard exposed in order that they might more effectually bite the object to be clamped, but in other cases it is desirable that the object be protected, as in the instance herein described, in which event I prefer to form a tongue 20 on the body portion 11 of the guard which is bent as shown to extend transversely to the general plane of the yoke and across the two edges of the wings.

One of the practical uses to which this device may be put is its application to the hose connection forming part of the train pipe connections on railway vehicles. Of these there are those used on the air brake and steam heating piping. Owing to the severe use to which these connections are subjected it is frequently necessary to repair them temporarily when a train is stopped *en route* at a station, and to this service my device lends itself as it may easily be applied in a transverse direction, to such hose connections without removing them or extracting their enlarged coupling members which would prevent a clamp from being applied in an endwise direction to such hose.

A device embodying my invention can be produced at a low cost as its preferred construction involves punch and die operations almost exclusively, although it will be understood that the parts of the clamp may be made of cast metal or otherwise formed. It will be further understood that the bite of the clamp may be made to approximate the contour of irregular or other specially formed objects as well as those having a cylindrical and substantially regular shape, as in the present instance.

I claim as my invention:

1. In a clamp, the combination with a supporting member having two walls movable relatively toward and from each other and an intermediate connecting wall, of a guard member having a rocking bearing on the outer side of one of the relatively movable walls and extending through an opening in the latter, means connecting the guard and the other wall for drawing said walls together and devices operated thereby for rocking the guard member toward the connecting wall.

2. In a clamp, the combination with a supporting member having two walls movable relatively toward and from each other and each provided with an opening and an intermediate connecting wall, of a guard member extending through the openings in both walls to have a bearing on the outer side of one of them and provided with a cam surface engaging the other and means connected with the latter wall and with the guard for drawing the relatively movable walls together and forcing the guard toward the connecting wall under the action of the cam.

3. In a clamp, the combination with a supporting member having two walls movable relatively toward and from each other, one of said walls being provided with an opening and an intermediate connecting wall, of a guard member having a rocking bearing on the outer side of one of the relatively movable walls and extending through the opening therein, means connecting said wall and the guard member for drawing said walls together and coöperating cam elements on the guard and the other movable wall, respectively, for rocking the guard toward the connecting wall as the movable walls are drawn together.

4. In a clamp, the combination with a supporting member comprising a yoke having arms movable relatively toward and from each other, of means extending between the arms for operating them relatively, an abutment on one of said arms arranged on one side of said means and a guard member extending transversely of the yoke and having a rocking bearing on the other arm at the other side of said means and provided with a cam engaging the abutment.

5. In a clamp, the combination with a supporting member comprising a yoke having arms movable relatively toward and from each other, one of said arms being provided with an abutment and the other with an opening, of a guard having a rocking bearing on the outer side of the latter arm to extend through the opening and provided with a cam surface engaging the abutment on the former and a bolt extending between the arms and arranged to bear upon the guard at one end and upon the opposite movable arm at the other for drawing the arms together and forcing the guard toward the closed end of the yoke.

6. In a clamp, the combination with a supporting member comprising a yoke having relatively movable arms, one of said arms being provided with an opening, of a guard arranged to extend across the yoke having a rocking bearing on the other arm and extending through the opening, said guard being provided with a cam surface engaging a wall of the latter and means for drawing the arms together whereby the guard is forced toward the closed end of the yoke as its end is projected through the opening.

7. In a clamp, the combination with a supporting member comprising a yoke having relatively movable arms, each provided with an opening, of a guard member extending across the yoke and through both arms, said guard being removable through the opening in one of them and provided with a projection forming a bearing on the outer side of said arm and with a cam surface engaging a wall of the opening in the other arm, and a bolt extending through both arms and through the guard, said bolt being arranged in engagement with the latter adjacent its bearing at one end and in engagement with the opposite arm at the other whereby the arms may be drawn together and the guard forced inwardly toward the closed end of the yoke.

8. In a clamp, the combination with a supporting member embodying a yoke having relatively movable arms, each provided with an opening, of a guard extending across the yoke and comprising a body portion having an extension forming an open bearing on the other side of one arm and wings disposed at right angles therefrom in the general plane of the yoke to project through the openings of both arms, said wings being curved to constitute cam surfaces engaging a wall of the opening of the arm opposite to the bearing arm and a threaded bolt connecting the body portion of the guard and the opposite arm.

9. In a clamp, the combination with a supporting member embodying a yoke having relatively movable arms, of a guard extending across the yoke and comprising a body portion having a rocking bearing on one arm and wings disposed at right angles therefrom in the general plane of the yoke toward the other arm, said body portion also being provided with a tongue disposed transversely to the general plane of the yoke to cover the inner exposed edges of the wings, means for drawing the yoke arms together and devices for forcing the guard toward the closed arm of the yoke in unison therewith.

FRANK J. CHRISTMAN.

Witnesses:
M. F. VENNER,
F. H. PLUMB.